United States Patent [19]

Rose et al.

[11] Patent Number: 4,958,970

[45] Date of Patent: Sep. 25, 1990

[54] GRADUATED-LOAD SPRING WASHER SYSTEM FOR SCREWS AND THREADED FASTENERS

[75] Inventors: James D. Rose; William H. Suder, III, both of Canoga Park, Calif.

[73] Assignee: The United States of America as represented by the Secretary of the Navy, Washington, D.C.

[21] Appl. No.: 233,291

[22] Filed: Aug. 17, 1988

[51] Int. Cl.⁵ .............................................. F16B 31/02
[52] U.S. Cl. ...................................... 411/12; 411/159; 411/261; 411/531; 411/544
[58] Field of Search ................................. 411/10–12, 411/147, 149–151, 157, 159, 261, 313, 314, 369, 531, 538, 544, 152, 153, 158, 248, 249, 260, 262, 366, 535, 536

[56] References Cited

U.S. PATENT DOCUMENTS

| | | | |
|---|---|---|---|
| 646,226 | 3/1900 | Kleman | 411/159 |
| 903,109 | 11/1908 | Ross | 411/159 |
| 1,320,259 | 10/1919 | Märtens | 411/149 |
| 1,393,910 | 10/1921 | Schoenert | 411/159 |
| 1,753,313 | 4/1930 | Norwood | 411/157 |
| 2,014,995 | 9/1935 | Washer | 411/159 X |
| 2,713,482 | 7/1955 | Stapleton | 411/544 X |
| 3,503,430 | 3/1970 | Tsurumoto | 411/147 |
| 3,992,974 | 11/1976 | Miki et al. | 411/544 |
| 4,157,725 | 7/1979 | Stanaitis | 411/531 X |

FOREIGN PATENT DOCUMENTS

| | | | |
|---|---|---|---|
| 328060 | 10/1920 | Fed. Rep. of Germany | 411/261 |
| 889091 | 9/1943 | France | 411/538 |
| 1224480 | 4/1986 | U.S.S.R. | 411/544 |
| 266588 | 3/1927 | United Kingdom | 411/313 |
| 870946 | 6/1961 | United Kingdom | 411/10 |
| 1035315 | 7/1966 | United Kingdom | 411/531 |

Primary Examiner—Gary L. Smith
Assistant Examiner—Jerry Redman
Attorney, Agent, or Firm—David S. Kalmbaugh; Ron Billi

[57] ABSTRACT

A graduated-load spring washer system for screws and threaded fasteners uses a deflection coil spring of slightly less than one coil with special end configurations for anti-marring. A cross-section of the coil spring is substantially trapezoidal, with the outer periphery thickness being the dimension of the trapezoid base and larger than the inner thickness dimension. When placed under the head of a threaded fastener and flattened upon tightening of the fastener, the device maintains a large tailored preload to prevent loosening even during and after stress relaxation and creep, and eliminates the need for a usual flat washer below the coil to prevent marring. The device also eliminates requirement for use of torque application measuring tools because preload can be determined by sight or tactile sensing.

8 Claims, 2 Drawing Sheets

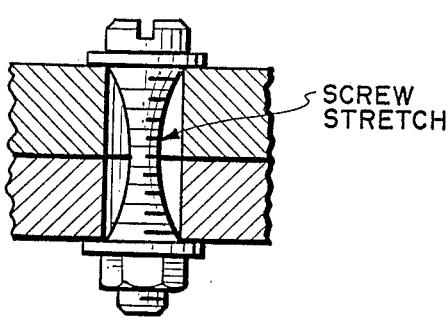
Fig. 1. PRIOR ART
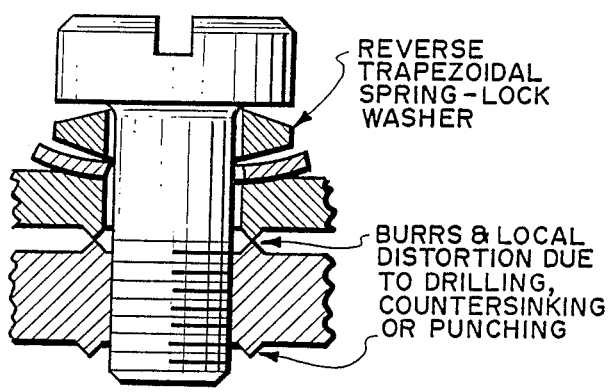
Fig. 2. PRIOR ART
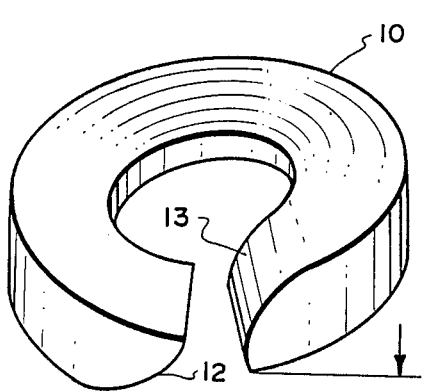
Fig. 3.
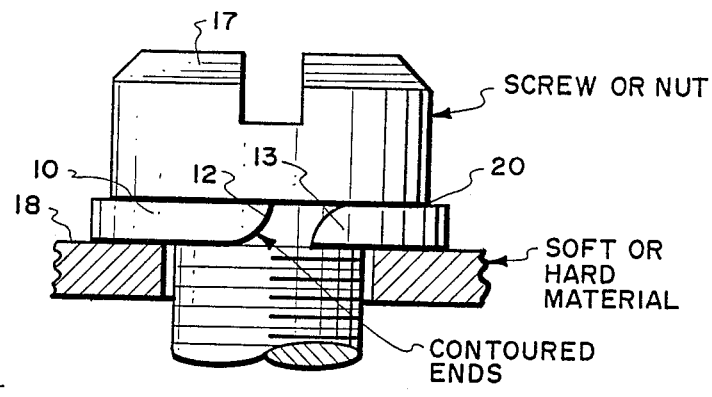
Fig. 4.
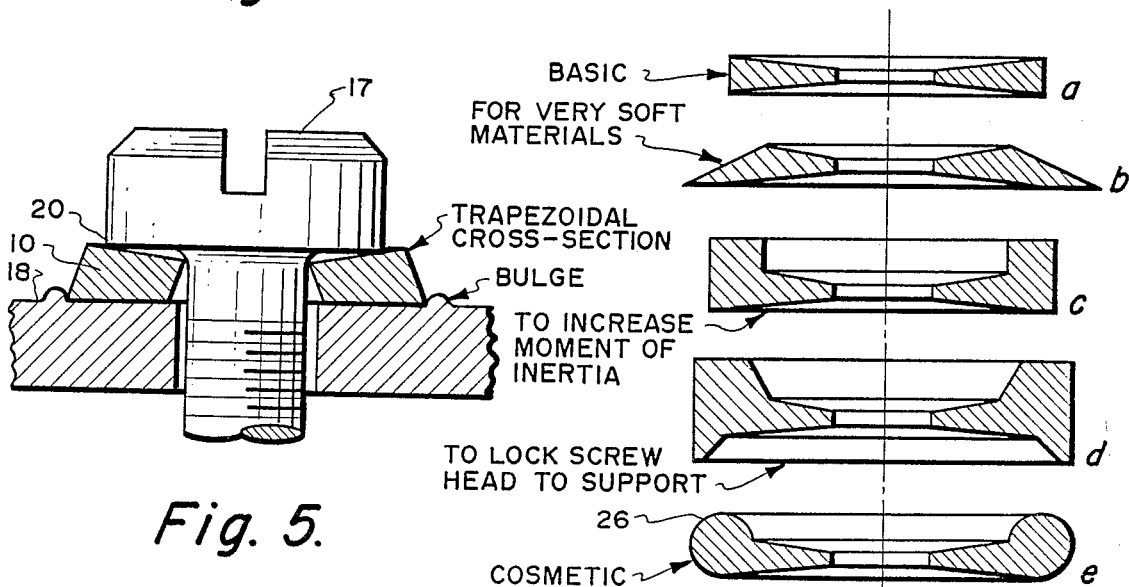
Fig. 5.
Fig. 6.

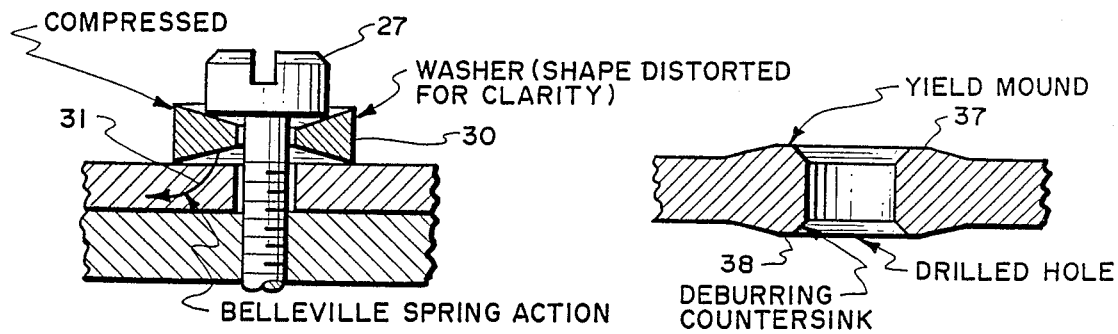
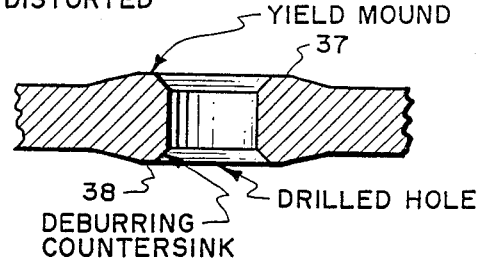
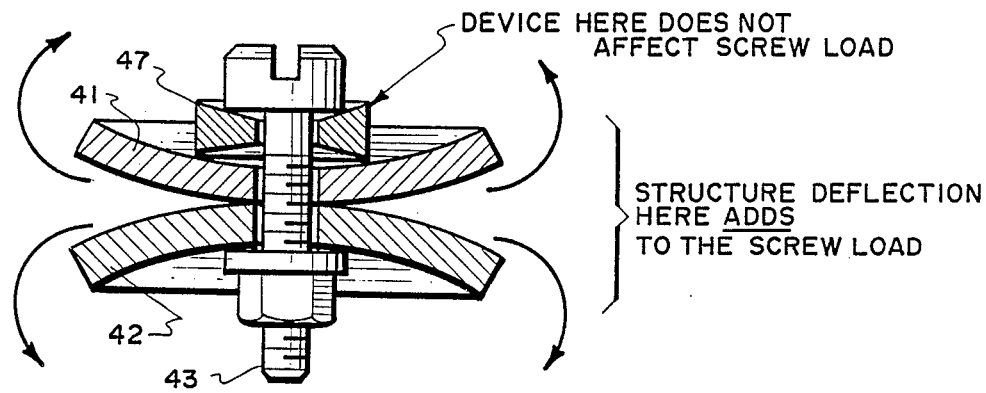
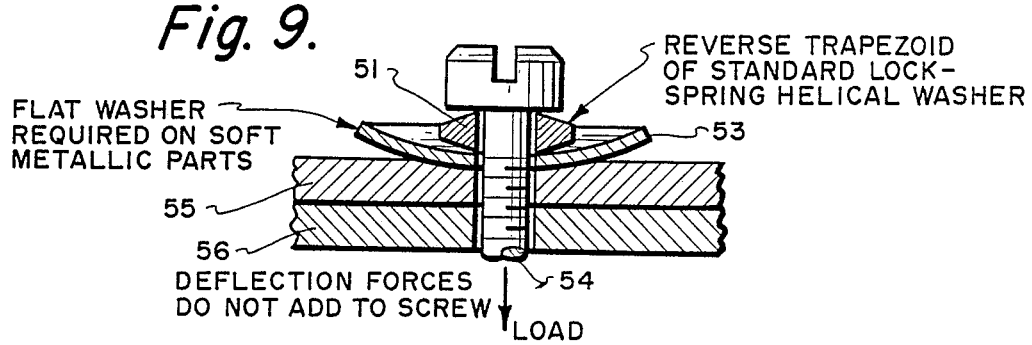
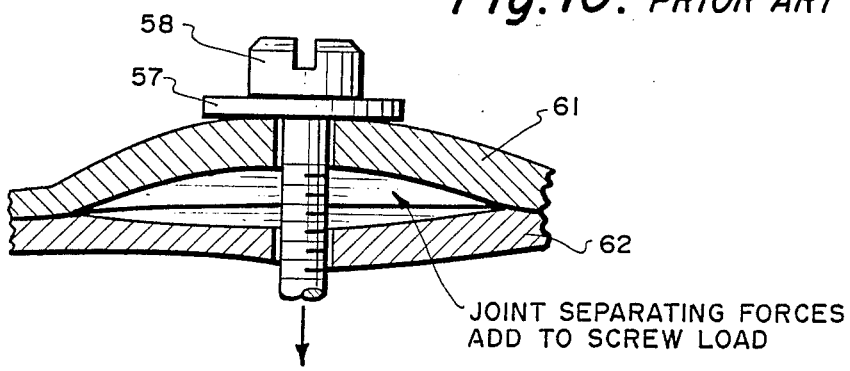

4,958,970

GRADUATED-LOAD SPRING WASHER SYSTEM FOR SCREWS AND THREADED FASTENERS

FIELD OF THE INVENTION

The present invention relates to spring washers and particularly to a graduated-load spring washer having a tailored configuration in screw or threaded fastener systems that will maintain large preloading and screw-locking force before, during and after joint thickness change due to material stress relaxation, creep or wear.

BACKGROUND OF THE INVENTION

Heretofore, there has been inadequate analysis and understanding of the very complex problem of threaded fasteners loosening and causing failures, often with disastrous results. Threaded fasteners are the most pervasive systems used in many critical hardware assemblies. There are four major requirements for a threaded fastener system to be reliable. These are: proper clamping force or preload; screw locking (anti-rotation); adjustment for stress relaxation and creep to maintain proper clamping force; and, screw, nut or head restraint to prevent relative motion between the screw and the clamped structure. A great deal of investigation and implementation has been directed to the first two requirements so that a working understanding is being used to control their variable characteristics. For such a simple and widely used system, controlling all the variables of the first two characteristics is not enough to produce a reliable system, as screws still loosen and fall out. Attention is directed to the last two requirements and the reasons why the system failures will continue to occur unless a working knowledge of their characteristics is pursued and new hardware and processes utilized.

Adjustment for stress relaxation and creep to maintain a proper clamping force is of major importance to prevent system failures. Stress relaxation is any joint thickness change due to plastic deformation above the yield strength of the metal or other material, and creep is plastic or permanent joint thickness change due to stress, temperature and/or time related conditions that occur below the yield strength. As to screw, nut or head restraint to prevent relative motion between the screw and the clamped structure, relative motion due to environmental forces will apply a torque to a screw head or nut that will be oscillatory and persistant. The torque to tighten the screw is resisted, while the torque to loosen the screw is not resisted. This ratchet action will cause a screw to loosen and fall out.

In an idealized screw joint, the only spring force to keep the joint tight is the tension created in the screw itself, see the exaggerated illustration of FIG. 1, for example, showing the screw stretched. The introduction of other spring forces is thought to seriously degrade joint performance because of possible screw fatigue or overloading. All screw systems are designed with this idealized system in mind. Very seldom do the actual hardware and fabrication processes produce the idealized system.

Screw joints frequently have a lot of springs beside the screw itself, both inside and outside of the clamped joint sandwich. If these springs do not change, then their forces produce a joint that operates reliably, even when joint characteristics change. These springs will not degrade screw performance in fatigue or overload environments because the actual screw loads are generally very low. Screws and nuts, nevertheless, can be loosened by vibrations at their natural frequencies, without application of external forces.

Standard hardware used in a typical screw system, together with the standard machining processes utilized to fabricate the support structures, all work together to produce at least seven spring systems in the screw joints such as shown in FIG. 2, for example. Some of the hardware configurations depicted produce springs that can easily change when subjected to large screw forces or environmental conditions that promote stress relaxation and creep.

Creep is stress, temperature and time related, and it is that characteristic of a material that results in permanent deformation even when the material is stressed below its yield point. Any creep that occurs reduces the joint thickness and thereby reduces the screw clamping load. The actual screw-spring stretch is so small that very little joint thickness change needs to occur to produce a loose assembly. Also, any environmental forces that produce clamped plate relative motion at the screw head or nut can cause an unscrewing process to occur. These motions can be large or as small as a millionth of an inch.

A comparison of screw-joint spring systems reveals that all have very low spring rates when measured against the screw itself. These low rates produce very small serial forces that can have large reductions with small joint thickness changes. Joint thickness changes will occur due to stress relaxation and creep wherever the screw load is supported by very small areas. This condition can occur in all the spring systems including the screw itself. Causes of this thickness change are many; they include: large screw forces; burrs; shock; rough surface texture; temperature changes; plating crushing and wear; material stress relief due to vibration; plate ringing during vibration; and, poor geometry, including hole edge mounding due to machining forces, potato-chip surfaces typical of sheet metal parts, and non-coplanar support surfaces. The variety of the listed causes are numerous. Experience, however, indicates that screw systems, as a whole, operate reliably. The configurations depicted in FIG. 2, with environmental inputs, unfortunately, do cause unpredictable and seemingly random failures. It is because of these failures that changes in fabrication processes and hardware configurations become necessary in critical situations where a very high degree of confidence that the system operate reliably is required.

Joint thickness changes and the attendant problems read to be minimized. Part fabrication processes that produce flat mating surfaces are important. This can be done by making surfaces near screw holes flat after all drilling, deburring, plating and insert assembling by any of a variety of processes including: surface grinding, spot facing, lapping, surface crushing, and single-point skin cutting. However, a new approach is to eliminate the effects of stress relaxation and creep without any changes in existing fabrication techniques and assembly processes. It has been found that this can be accomplished with a low-rate high-force spring placed under a screw head or under a nut to provide a continuously large force during and after joint thickness changes due to stress relaxation, creep or wear. Prior devices, such as a Belleville washer, wave washer, extra duty spring-lock washer, or any one of several other clever spring-type systems have been considered for this purpose. None of these aforementioned configurations, however, are completely suitable because: most require an additional flat washer; some have relatively little deflection, most do not exert high required loads; some are too large; some are too costly; and, all require the rigorous use of torque measuring devices and processes.

A new device which has characteristics that meet most of the necessary requirements for a threaded connection to prevent loosening, as discussed above, is an inexpensive graduated-load spring washer system for screws and threaded fasteners, hereinafter described below.

SUMMARY OF THE INVENTION

The present invention is a graduated-load deflection coil spring of slightly less than one coil having specially contoured end shapes for anti-marring. This graduated-load spring is placed under the head of a threaded fastener and is flattened upon tightening of the fastener to maintain a large tailored preloading thereon for preventing loosening even after stress relaxation, creep and wear. Need for a flat washer beneath the coil spring is eliminated, since minimum marring of the surface below the coil occurs.

The graduated-load spring washer system is designed for precise preloading of soft or hard materials, and it provides a large preload with very large deflection. The device, which occupies a small volume, will maintain a large anti-unscrewing force even if a joint is loose, and it also eliminates or reduces the need for using a torque wrench. Locking torque is applied at the largest screw-head radius, and the device will not degrade the screw fatigue or overload capability. Use of the graduated-load spring washer system keeps joints loaded although large joint-thickness changes occur. It provides easy and reliable visual inspection capability as well.

The foregoing and other aspects will become apparent from the following detailed description of the invention when considered in conjunction with the accompanying drawings, wherein like numerals refer to like parts in each of the figures. It is to be expressly understood, however, that the drawings are not intended as a definition of the invention, but are for the purpose of illustration only.

BRIEF DESCRIPTION OF THE DRAWINGS

FIG. 1 is an idealized cross-sectional view of a typical prior-art screw joint with the screw stretch exaggerated.

FIG. 2 shows a typical prior-art screw joint having the present standard reverse trapezoidal spring-lock washer and depicting burrs and local distortion caused by drilling, punching, threading and countersinking.

FIG. 3 is a free configuration perspective view of a preferred embodiment of the graduated-load spring washer of the present invention.

FIG. 4 illustrates a typical screw joint showing a graduated-load spring washer, as in FIG. 3, in the compressed state.

FIG. 5 illustrates a typical screw joint showing the outward trapezoidal cross-sections of a compressed graduated-load spring washer, such as in FIG. 4.

FIG. 6a also shows the basic outward trapezoidal cross-sections of a preferred embodiment of a flattened graduated-load spring washer as in FIG. 1.

FIG. 6b shows cross-sections for another embodiment of a graduated-load spring washer particularly useful with very soft materials.

FIG. 6c shows cross-sections of still another embodiment of a graduated-load spring washer which helps to increase the moment of inertia.

FIG. 6d shows cross-sections of a further embodiment of a graduated-load spring washer which is used to lock a screw head to a support plate by embedding the periphery into the support plate.

FIG. 6e is a variation of the embodiment shown in FIG. 6a, providing a raised rim for cosmetic purposes.

FIG. 7 is another cross-sectional view of a typical screw joint using a preferred embodiment of the invention where the cross-sections of the washer are trapezoidal with straight sides, and with the outer edge of the screw head compressing the larger diameter washer at a distance inward from its outer periphery to provide Belleville-spring action.

FIG. 8 illustrates yield mounds caused by drill and punching compression forces.

FIG. 9 illustrates that the graduated-load spring washer does not affect screw load, whereas structure deflection can add to the screw load.

FIG. 10 shows a typical prior-art screw joint where the reverse trapezoid of a standard lock-spring washer causes deflection of the support structure.

FIG. 11 illustrates distorted support structure geometry in a prior-art screw joint caused by fabrication processes which result in deflections that add to a screw load.

DESCRIPTION OF THE PREFERRED EMBODIMENTS

The graduated-load spring washer 10, as shown in FIG. 3, is fabricated in the shape of a coil spring of slightly less than one coil, a configuration somewhat similar to a helical-spring lock washer without the sharp end locking claws. Each of the ends 12 and 13 have a progressively curved surface, as shown, that always present a large smooth area against the support surface in order to minimize surface damage and thereby allow the elimination of the usually required flat washer.

Graduated-load spring washer 10 is designed to produce a precise preload for each specific material that will be clamped by the system. These materials vary from soft gasket-type plastics to high strength metallics. The device has a relatively low spring rate so that a large deflection is required by screw 17 to compress the spring 10 to the flat working condition against part 18, as shown in FIG. 4. The low spring rate characteristic provide a constant preload during and after joint thickness changes that may be due to material stress relaxation, creep or wear. This large deflection characteristic can also be used as a precise visual inspection aid for easily detecting a loose joint and allowing the joint to be assembled by sight or tactile sensing only.

High strength wire, with a special cross-section that produces a slight trapezoidal shape when coiled to size, with the trapezoid base at the outer periphery of the coil, such as shown in FIG. 5 for example, is generally used to make the graduated-load spring washers 10. This special cross-sectional shape assures that the large preload force is applied to washer 10 at edge 20, which is at the largest diameter of the screw head, as can be seen in FIGS. 4 and 5. The preload force generates a frictional force that produces a large resistive torque that reliably provides a primary or secondary screw-locking system. This particular device has the capability to apply a very large percentage of the screw induced preload if a joint thickness change occurs that would reduce the preload to zero without it. The graduated-load spring washers apply a spring force that is applied in opposition to the forces that cause joint separation, and therefore, do not degrade the screw fatigue capability or cause structural configuration changes that could expose the screw to overload failure. The screw or threaded fastener 17 can be tightened by sight and feel, without the need for using a torque wrench or other torque measuring devices.

Graduated-load spring washer 10 can be made with various other cross-sections than that of the typical basic cross-section shown in FIGS. 5 and 6a. A cross-section that is wider and useful with soft materials is shown in FIG. 6b. And, a cross-section for increasing the moment of inertia is illustrated in FIG. 6c, while the cross-section shown in FIG. 6d is for a graduated-load spring washer designed to enhance the locking of the screw head to a support plate. The cross-section of the graduated-load spring illustrated in FIG. 6c is tailored with a raised rim to have a polar moment of inertia that will apply a torsional force to keep screw 17 tight during angular accelerations or decelerations of an aircraft or other vehicle which may use screw 17. The cross-section shown in FIG. 6e is a variation of the basic washer with a raised rim 26 primarily for cosmetic purposes.

It is very difficult to establish a joint-designed clamping force. The standard more easily used assembly methods amount to expert guesses only. The resistance to screw rotation due to increasing loads imposed by screw stretching varies because of surface finishes, structural deformations, and imperfect hardware. The most generally used system to establish the clamping force is the torque wrench. A torque wrench acting on a joint system can easily produce clamping loads that vary as much as 200 percent.

The graduated-load spring washer system of the present invention can be tailored to provide a precise clamping-force due to its similarity to a single turn coil spring. The present device has the capability to provide for small loads as a single turn coil spring or large loads due to its deflection similar to a Belleville washer. Belleville-spring action of the graduated-load spring washer 10 is indicated by arrow 31 in FIG. 7, where the cross-sections of the washer are shown as true trapezoids and the downward force from the outer edge of screw head 27 is applied at a point inward from the outer periphery of washer 30. As long as the preloading device is external to the screw joint, fatigue and overload capabilities of the screw are not degraded. A torque wrench is not needed as the screws can be tightened by sight and feel only.

The present device can be used with all sizes of screws and threaded fasteners; it provides a very large screw-locking torque that will not be degraded with reuse, and will provide continuous locking even if the joint loosens. The new device provides screw head or nut locking forces at their extreme diameters, as illustrated by FIGS. 4, 5 and 7, and provides an eccentric load to the screw head or nut in such a way that screw-locking is enhanced, as particularly shown in FIG. 7.

All screw joints change their clamped thickness and become thinner after assembly; this continues progressively during their operational life. This thickness change is due to stress relaxation and creep primarily at the "yield mounts." These yield mounts occur on any part that is drilled or punched, see FIG. 8, and are caused by hole generating compression forces. The very small mound areas 37 and 38 support the very large screw forces imposed on a screw-joint sandwich. These are somewhat similar to the burrs in the screw-joint sandwich shown in FIG. 2, for example. The mounds 37 and 38 will continuously deform to support the screw force both during and after joint assembly. Because this deformation is always greater than the screw stretch, the joint clamping force is progressively reduced. Every screw joint, however, will not become loose, because inadvertant structural deflection, which are many times the screw stretch, tend to keep the joint tight even after all yield mound deformation has taken place. Such structural deflection is not purposely designed into a system because its presence can seriously degrade the joint's fatigue and overload capabilities.

Graduated-load spring washers will provide a continuous and correct preload during all joint thickness changes because of its very large assembly deflection. The washer 10 will not degrade fatigue or overload capabilities because, as it is used, it is not in the joint sandwich. This is illustrated in FIG. 9, for example, where structural deflections of joint members 41 and 42 add to the load on screw 47, but washer 10 does not affect the screw load. If the structural deflections are relatively large, a high percentage of any joint separating force will be applied directly to the screw.

Other examples of inadvertant structural deflection are shown in FIGS. 10 and 11, by way of example. Inadvertant external structural deflection which is beneficial is shown in FIG. 10, where a standard lock-spring washer 51 having a reverse trapezoid cross-section and a flat washer 53 are used together with screw 54 to clamp parts 55 and 56 together. Inadvertant internal structural deflection which is degrading is shown in FIG. 11, where a flat washer 57 and screw 58 are used to clamp parts 61 and 62 together. Due to the distorted or potato-chip geometry of parts 61 and 62, caused by any of a variety of fabrication processes, the deflection forces (spaces) add to the screw load.

The present graduated-spring load washer system provides anti-ratchet forces by: providing a conical surface, see washer 30 in FIG. 7, for example, to centrally position the screw head or nut; providing a very large force to hold the screw head or nut in this central position; providing a small area at maximum diameter to produce elastic structural deformation that requires a large force to change its established position; and, providing a large force to produce a resistance to motion due to the coefficient of friction between the mating surfaces. The graduated-load spring washer also has the capability to be used with all types of screws and throughout large temperature ranges.

The need for an additional flat washer on soft metals or plastic parts is eliminated with the use of the present device. As previously mentioned, the ends 12 and 13 of the graduated-load spring washer 10 are progressively curved, having special stress distributing radii that minimize support surface damage. The graduated-load spring washers also eliminate the need for the use of stress paint dots or other methods used to detect a loosened joint, and can be made inexpensively from a variety of engineering materials on existing machines.

Obviously many modifications and variations of the present invention are possible in the light of the above teachings. It is therefore to be understood that within the scope of the appended claims, the invention may be practiced otherwise than as specifically described.

What is claimed is:

1. A graduated-load spring washer system for screws and threaded fasteners to maintain a tailored preload and screw-locking force on a sandwiched joint to prevent loosening before, during and after joint thickness changes caused by material stress relaxation, creep and wear, comprising:
   a. A threaded fastener means and a graduated-load spring washer;
   b. said threaded fastener means, having a head, being operable to apply compressive load forces to said graduated-load spring washer and said sandwiched joint when tightened;
   c. said graduated-load spring washer comprising a deflection coil spring of slightly less than one coil;
   d. said coil spring having an upper surface that is in contact with the outer circumference of the head of said fastener means throughout the tightening process whereby the contact between the head and said upper surface of the coil spring is spaced inwardly from the outer circumference of the coil spring;
   e. said coil spring having a lower surface that provides a gap between the lower surface of said coil spring and the surface of said sandwiched joint, said lower surface pressed flat against said surface of said sandwiched joint when said graduated-load spring washer is fully compressed;
   f. said coil spring having an outer peripheral surface and an inner peripheral surface, said outer peripheral surface determining the greater thickness of said graduated-load spring washer;
   g. the opposite ends of said slightly less than one coil spring having a specially contoured configuration which prevents marring and minimizes damage of external surfaces of the sandwiched joint;
   wherein a precise preloading of force is applied by said threaded fastener means to said graduated-load spring washer at a position directly below said outer circumference of said head of said threaded fastener means and onto said upper surface of said graduated-load spring washer when said threaded fastener is tightened to flatten said graduated-load spring washer coil against the sandwiched joint, thereby maintaining a large anti-unscrewing force, spring force and centering force applied in opposition to forces that cause joint separation, thus keeping the sandwiched joint compressively loaded although large joint-thickness changes occur; and without degrading fatigue capability of the fastener means or causing structural configuration changes that make the fastener means susceptible to overload failure.

2. A graduated-load spring washer system as in claim 1, wherein said threaded fastener means is a screw means having a head portion with a greater diameter than its threaded screw portion, and which applies a locking torque and compressive force to said graduated-load spring washer at the largest diameter of said screw means head portion.

3. A graduated-load spring washer system as in claim 1, wherein said graduated-load spring washer has a low spring rate and a large combined deflection of said opposite ends and said lower surface when said lower surface is pressed flat against said sandwiched joint thereby providing a large deflection force to keep said sandwiched joint tight.

4. A graduated-load spring washer system as in claim 1, wherein said lower surface, said outer peripheral surface and said inner peripheral surface are straight.

5. A graduated-load spring washer system as in claim 1, wherein the large deflection characteristic of said spring coil provides a precise visual inspection for detecting a loose joint in the system.

6. A graduated-load spring washer system as in claim 1, wherein said upper surface and said lower surface taper from said greater dimension at the outer peripheral surface to said lesser dimension at said inner peripheral surface.

7. A graduated-load spring washer system as in claim 1, wherein said threaded fastener means applies a locking torque to said graduated-load spring washer at the largest diameter of said threaded fastener means.

8. A graduated-load spring washer system as in claim 1, wherein the cross section of said graduated load spring washer is substantially trapezoidal and wherein said upper and lower surfaces taper from a greater dimension at said outer periphery surface.

* * * * *